United States Patent [19]
Makati et al.

[11] Patent Number: 5,569,686
[45] Date of Patent: Oct. 29, 1996

[54] POLYMERIC ADHESION PROMOTER AND LATEXES; AND POLYMERIC ADHESION PROMOTER, EPOXY RESINS AND LATEXES ARE USED TO IMPROVE ADHERENCE BETWEEN VARIOUS SUBSTRATES

[75] Inventors: Ashok C. Makati; Charles S. Kan; Robert T. Iwamasa; Do I. Lee, all of Midland, Mich.

[73] Assignee: The Dow Chemical Company, Midland, Mich.

[21] Appl. No.: 495,504

[22] Filed: Mar. 19, 1990

Related U.S. Application Data

[63] Continuation-in-part of Ser. No. 206,957, Jun. 9, 1988, abandoned, which is a continuation-in-part of Ser. No. 177,804, Apr. 11, 1988, abandoned, which is a continuation-in-part of Ser. No. 50,117, May 15, 1987, abandoned, and a continuation-in-part of Ser. No. 206,958, Jun. 9, 1988, which is a continuation-in-part of Ser. No. 173,906, Mar. 28, 1988, abandoned.

[51] Int. Cl.$^6$ .................................................. C08K 3/20
[52] U.S. Cl. ........................... 523/409; 156/330; 523/411; 523/412; 524/217; 524/523; 524/525
[58] Field of Search .................. 156/330; 523/409, 523/411, 412; 524/217, 523, 525

[56] References Cited

U.S. PATENT DOCUMENTS

| | | | |
|---|---|---|---|
| 4,524,107 | 6/1985 | Marchetti et al. | 552/412 |
| 4,839,403 | 6/1989 | Sekmakas | 523/412 |
| 5,037,700 | 9/1991 | Davis | 428/414 |

FOREIGN PATENT DOCUMENTS

| | | |
|---|---|---|
| 0056452 | 7/1982 | European Pat. Off. . |
| 2101141 | 1/1983 | United Kingdom . |

*Primary Examiner*—Peter D. Mulcahy
*Attorney, Agent, or Firm*—J. H. Roberts

[57] ABSTRACT

The adhesive of the present invention includes latexes with an adhesion promoter which is preferably polyamidoamine. The addition of the polyamidoamine improves the adhesive strength between substrates such as between two plastic films or between a plastic film and paperboard. The present invention also provides for an adhesive prepared from a latex which is neutralized with a particular base and a hydrophobic polyamidoamine having particular amine values and viscosity whereby the strength of the adhesive bond is increased in humid conditions. The present invention also provides for adhesives primarily for use in laminate structures which are exposed to highly humid conditions. The adhesive is a polymeric latex based system to which a polymeric adhesion promoter like polyamidoamine and an epoxy emulsion are added. The adhesive retains bond strength when exposed to humidity. The scope of the invention also includes laminate structures prepared with the present adhesive and other substrate layered structures which utilize the adhesive.

10 Claims, No Drawings

POLYMERIC ADHESION PROMOTER AND LATEXES; AND POLYMERIC ADHESION PROMOTER, EPOXY RESINS AND LATEXES ARE USED TO IMPROVE ADHERENCE BETWEEN VARIOUS SUBSTRATES

CROSS-REFERENCE TO RELATED APPLICATION

This is a continuation-in-part of U.S. application Ser. No. 206,957, filed Jun. 9, 1988, abandoned, which is a continuation-in-part of U.S. application Ser. No. 177,804, filed Apr. 11, 1988, abandoned, which is a continuation-in-part of U.S. application Ser. No. 050,117, filed May 15, 1987, abandoned, and U.S. application Ser. No. 206,958; filed Jun. 9, 1988, which is a continuation-in-part of U.S. application Ser. No. 173,906, filed Mar. 28, 1988, abandoned.

BACKGROUND OF THE INVENTION

The present invention relates to an adhesive prepared from polymeric adhesion promoters such as polyamidoamine, and latexes. The adhesive is useful between various substrates such as between plastic films.

The present invention also relates to polymeric latex based adhesives which contain a polymeric adhesion promoter and epoxy emulsion to be used to laminate various substrates, such as plastic films.

Most plastic film is adhered to other plastic films and paperboard by use of solvent based adhesives and not by use of aqueous based systems such as latex systems.

Multilayer films are presently used in various types of packaging. Food items in particular are packaged in multilayer film packages. Individual films having different properties contribute those properties to the multilayer structure. For example, one film may have particularly good oxygen barrier properties while another may have excellent tensile strength.

The multilayer structure can be manufactured by adhesive lamination, coextrusion or extrusion lamination. The preferred multilayer structure of the present invention is the use of the adhesive in lamination. Typically films are laminated to each other by coating the primary film or web with an adhesive. The secondary web is then laminated to the primary web after the adhesive is dried.

Multilayer films are used in the food packaging industry for packaging various foodstuffs such as snack food, and processed meat and cheese. These meat and cheese packages are often exposed to high humidity. Therefore a retention of bond strength in high humidity is a desirable property in the laminated structure.

Solvent-born adhesives which impart strong bond retention between substrates in high humidity are normally used in adhering most plastic film to plastic films and other substrates. The good bond strength occurs with timer typically with a crosslinking reaction in the adhesive. Since the crosslinking does not occur instantaneously, the green strength (initial strength) of the bond could be poor and therefore undesirable. Such systems also result in difficult handling of the adhesive because the pot-life of such systems is relatively short.

The additional disadvantage to using solvent-based adhesives is solvent emission. The increased need for water based adhesives in an attempt to eliminate solvent emissions, necessitates an efficient and economical method of latex application to bond plastic substrates such as plastic film to plastic films, to paperboard or to other substrates without sacrificing the strength of the bond.

Other known adhesives in addition to the solvent based adhesives are latex based laminating adhesives which normally contain a wetting agent and a crosslinking agent. These systems typically have similar disadvantages to the solvent based systems, i.e. a short pot-life and insufficient green strength. The latex based adhesives also contain hydrophilic additives which impart wetting properties and latex stability. However, humidity will also weaken such latex based adhesive bonds.

In view of these disadvantages of present adhesive systems, it is desirable to provide an efficient latex aqueous adhesive to bond plastic substrates, such as plastic film to plastic films, to paper board and other substrates without sacrificing the initial strength of the bond or the strength of the bond after an elapsed period of time in both dry and humid environments and without sacrificing the pot-life of the adhesive.

SUMMARY OF THE INVENTION

Accordingly, the present invention is a latex adhesive for substrates which consists essentially of: (a) a carboxylated styrene/butadiene latex, and (b) polyamidoamine, present in an amount sufficient to promote adherence of the surface of a first substrate to the surface of the same or different substrate.

In another embodiment the present invention is a method of adhering plastic substrates which comprises:
  (a) providing a first plastic substrate having at least one major surface;
  (b) applying to the major surface, a latex adhesive, comprising:
    (i) a carboxylated styrene/butadiene latex, and
    (ii) polyamidoamine, present in an amount sufficient to promote adherence of the first plastic substrate to the same or different plastic substrate and
  (c) adhering a surface of the same or different plastic substrate to the major surface of the first plastic substrate having the latex adhesive thereon.

A laminate prepared with this adhesive is an additional embodiment of the invention.

Surprisingly, the latex adhesives of the present invention produce a strong bond between the substrates. The bond is particularly strong between two plastic substrates, and between a plastic substrate and paperboard.

Another embodiment of the present invention is an adhesive for substrates comprising a latex and polyamidoamine the improvement comprising, neutralizing the latex with a basic solution which is less detrimental to humid strength than sodium hydroxide, such as ammonium hydroxide, to a pH of at least about 8, and employing a polyamidoamine having a viscosity of from about 500 to about 150,000 poise at 25° C. and 20 RPM and an amine value of from about 90 to about 350 mg KOH/g, whereby the bond formed between the substrates by the adhesive has moisture resistance in humid environments.

In another embodiment the present invention is a method of adhering substrates which consists essentially of:
  (a) providing a first substrate having at least one major surface;
  (b) applying to the major surface, a latex adhesive, comprising:
    (i) a carboxylated styrene/butadiene latex which has been neutralized with a basic solution that is less detrimental to humid strength than sodium hydroxide, to a pH of at least about 8, and (ii) polyamidoamine, having a viscosity of from about 500 to about 150,000 poise at 25° C. and 20 RPM and an amine value of from about 90 to about 350 mg KOH/g present in an amount sufficient to promote adherence of the first substrate to the same or different substrate and (c) adhering a surface of the same or different substrate to the major surface of the first substrate having the latex adhesive thereon whereby the bond formed between the substrates by the adhesive has moisture resistance in humid environments.

Surprisingly, the latex adhesives employing the more specific polyamidoamine and neutralent of the present invention produce a strong bond between the substrates in humid environments. The bond is particularly strong between two plastic substrates, and between a plastic substrate and paperboard.

Applicants have also discovered that the adhesive of the present invention can be even more greatly enhanced in humid environments when an epoxy resin is also added to the adhesive formulation.

Accordingly, the present invention is also an adhesive formulation for substrates which provides a bond between a substrate and a same or different substrate which consists essentially of: (i) a carboxylated styrene/butadiene latex; (ii) at least one polymeric adhesion promoter present in an amount sufficient to promote adherence of the surface of a first substrate to the surface of the same or different substrate; and (iii) an epoxy emulsion in an amount sufficient to improve adherence of the surface of the first substrate to the surface of the same or different substrate under humid conditions; whereby the adhesive formulation comprising (i), (ii) and (iii) provides an increase in percent retention between dry strength and wet strength of the bond over an adhesive formulation which does not comprise (i), (ii) and (iii).

The present invention also provides for a laminate structure for substrates prepared with an adhesive formulation which consists essentially of: (i) a carboxylated styrene/butadiene polymeric latex; (ii) at least one polymeric adhesion promoter present in an amount sufficient to promote adherence of the surface of a first substrate to the surface of the same or different substrate; and (iii) an epoxy emulsion in an amount sufficient to improve adherence of the surface of the first substrate or film to the surface of the same or different substrate or film under humid conditions; whereby the adhesive formulation comprising (i), (ii) and (iii) provides an increase in percent retention between dry strength and wet strength of the bond over an adhesive formulation which does not comprise (i), (ii) and (iii).

Applicants have also discovered that the adhesives of the present invention can coagulate in hard water and cause difficulty in maintenance of processing equipment. Therefore, the present invention also provides for the addition to the adhesive of an effective amount of a surfactant whereby coagulation of the adhesive in water containing ions is inhibited.

DETAILED DESCRIPTION OF THE INVENTION

The term "substrate" means any solid material having a surface which can be adhered to a complimentary surface of the same or different substrate with the present latex and polyamidoamine adhesive composition. The term substrate is inclusive of any type of naturally occurring and synthetic solid materials. Representative examples of such solids and their forms include the following: plastic, plastic film, paper, paperboard, fabrics, wood, glassy ceramic, metal, foil, metalized plastic filmy or most any other solid in the form of a film, sheet, board or block.

The term "plastic substrates" is inclusive of all conventional plastic substrates, for example, polyolefin films, such as polypropylene and polyethylene, as well as polyester film or polyamide film.

Plastic substrates generally have low energy surfaces and are difficult to adhere to other substrates. Therefore, the surfaces are normally activated by flame oxidation, corona discharge, and chemical etching or primer coatings in an attempt to improve adhesion.

The term "laminate" as used herein, is meant to include structures which are manufactured by lamination, using the present latex and polymeric adhesion promoter adhesive as the laminating adhesive. A laminate structure is typically comprised of substrates which are laminated to the same or different substrate. The film laminate structure is typically comprised of films which are laminated to each other by coating the primary film or web with the present adhesive. The secondary web is then laminated to the primary web after the adhesive is dried.

The term "latex" is inclusive of all conventional water-based latexes. Representative latexes include styrene/butadiene copolymers; vinyl acetate homopolymer and copolymers; vinylidene chloride/butadiene copolymers; vinylidene chloride copolymers; vinyl chloride copolymers; and acrylate and methacrylate homopolymers and copolymers.

The latexes of the present invention may be prepared by conventional methods such as emulsion polymerization.

Typical monomers that could be employed to produce homopolymer or copolymer latexes to be used in a laminating adhesive system of the present invention, include monovinyl aromatic monomer, aliphatic conjugated diene, acrylate monomer, a vinylidene halide or vinyl halide monomer, vinyl esters of carboxyl acids containing from 1 to 18 carbon atoms, such as vinyl acetate or vinyl stearate, methacrylonitrile and acrylonitrile. Optionally a monoethylenically unsaturated carboxylic acid monomer could be used. Crosslinking agents such as divinylbenzene, ethylene glycol dimethacrylate could also be used.

The term "monovinyl aromatic monomer", as used herein, is meant to include those monomers with a radical of the formula

(wherein R is hydrogen or a lower alkyl such as an alkyl having from 1 to 4 carbon atoms) attached directly to an aromatic nucleus containing from 6 to 10 carbon atoms, including those wherein the aromatic nucleus is substituted with alkyl or halogen substituents. The preferred monomers are styrene and vinyltoluene.

The term "aliphatic conjugated diene", as used herein, is meant to include compounds such as 1,3-butadiene, 2-methyl-1,3-butadiene, piperylene (1,3-pentadiene), and other hydrocarbon analogs of 1,3-butadiene.

"Vinylidene halides" and "vinyl halides" suitable for this invention include vinylidene chloride and vinyl chloride, which are highly preferred. Vinylidene bromides and vinyl bromide can also be employed.

The term "acrylate", as used herein, is meant to include the acrylate or methacrylate monomers. Additionally, the acrylates can include acids, esters, amides, and substituted derivatives thereof. Generally, the preferred acrylates are $C_1$–$C_8$ alkyl acrylates or methacrylates. Examples of such acrylates include butyl acrylate, hexyl acrylate, tert-butyl acrylate, methylmethacrylate, butylmethacrylate, hexylmethacrylate, isobutylmethacrylate, and isopropylmethacrylate. The preferred acrylates are butyl acrylate and methylmethacrylate.

The term "monoethylenically unsaturated carboxylic acid monomer", as used herein, is meant to include those monocarboxylic monomers such as acrylic acid, and methacrylic acid, dicarboxylic monomers such as itaconic acid, fumaric acid, maleic acid, and their monoesters.

The most preferred copolymer latexes to be used in a laminating adhesive system of the present invention are prepared as carboxylated styrene/butadiene latexes in various ratios.

The resulting latex will be neutralized with a base to a pH of at least about 8, preferably about 10.5. If a humidity resistant bond is required, some bases such as sodium hydroxide will interfere with humid strength. Therefore, it is necessary to choose a base such as ammonium hydroxide to neutralize the latex if humidity resistance is a specified adhesive property.

The latex is normally present in the adhesive an amount of at least about 80 to at most about 99 percent by weight of the total latex adhesive.

Polymeric Adhesion Promoter

"Polymeric adhesion promoters" typically employable in the present invention include cationic polymers containing an $NH_x$ group such as polyamidoamine wherein x is from 1 to 2.

The preferred adhesion promoter is a polyamidoamine which can be a branched compound, a linear or crosslinked compound or a polyamide or polyamido resin such as is indicated by the following structures.

Linear

Branched

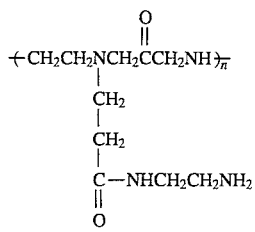

Crosslinked

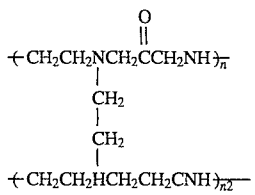

Polyamide

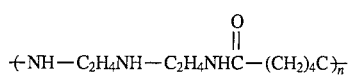

Polyamido Resin

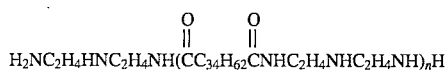

The polyamidoamine can be based on reaction products of dibasic acid and polyamine, or dimer acid and polyamine, or fatty acid and polyamine.

The adhesion promoter may also be a combination of the above-described compounds.

Other suitably employable adhesion promoters include:

Polyamines

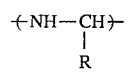

1.) Polyethyleneimine 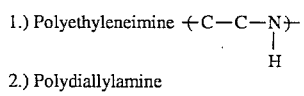

2.) Polydiallylamine

Polyurea

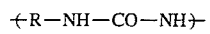

Polyurethane

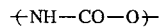

Polyoxazoline Hydrolyzed to Various Degrees

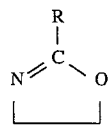

Polymers from Condensation Reaction of Epichlorohydrine and polyamines

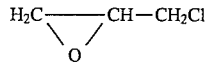

Copolymers of Acrylamide and Cationic Monomers $(H_2C=CHCONH_2)$

Poly(N-Vinylpyrrolidone) and Analogs

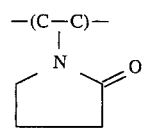

The polymeric adhesion promoter can also be a combination of the above-described compounds.

The polymeric adhesion promoter is typically incorporated by post-adding to the latex. Normally the polymeric adhesion promoter is present in the adhesive in an amount sufficient to promote adherence of the surface of a first substrate to the surface of the same or different substrate. Typically a sufficient amount is an amount of at least about 1 weight percent and no more than about 15 weight percent based upon the weight of the total latex adhesive.

If humidity resistance of the adhesive bond is sought, the preferred polyamidoamine will be hydrophobic, containing an amine value and a molecular weight sufficient to inhibit the water-sensitivity of the polyamidoamine. Typically the appropriate amine value will be from about 90 to about 350 mg KOH/g. Preferably the amine value will be from about 200 to about 300 and most preferably from about 230 to about 250 mg KOH/g. The amine value is determined by the milligrams of potassium hydroxide equivalent to the alkalinity present in one gram of sample. The reactive polyamidoamine is dissolved in nitrobenzene and acetic acid is added. The sample solution is then potentiometrically titrated with standard perchloric acid to determine the amine alkalinity which is the amine value. Additionally, the viscosity of the polyamidoamine should be from about 500 to about 150,000 poise at 25° C. and 20 RPM. Preferably, the viscosity will be from about 2,000 to about 15,000 and most preferably, the viscosity will be about 4,000 poise at 25° C. and 20 RPM. The viscosity is determined on a Brookfield RV viscometer at 20 RPM, 25° C., using spindle number 3.

Although the latex adhesives of the present invention may be totally latex based systems and do not require conventional tackifiers, such conventional tackifiers may be added to the latex polymeric adhesion promoter blend to formulate a latex adhesive. Such tackifiers include natural resin esters and synthetic tackifiers.

These tackifiers are normally added in an amount of up to about 80 weight percent of the latex.

The Preparation of the Polymeric Latex

The polymeric latex is prepared by conventional emulsion polymerization techniques. Water and a seed latex are introduced into a reactor equipped with lab pumps to deliver monomer and aqueous feeds. The reactor is purged with nitrogen and heated. Over a four hour period is added two monomer streams and a third stream containing water, aqueous surfactant sodium hydroxide and sodium persulfate. Following the addition of the monomer streams and aqueous streams, the reaction mixture is sustained at a heated temperature for one additional hour and then cooled. The latex is steam distilled to remove unreacted monomers. A neutralent is then added to the latex to bring the pH to about 10.

The neutralent chosen is dependent on the hydrophilicity or hydrophobicity of the polymeric adhesion promoter chosen. If the polymeric adhesion promoter is hydrophilic, ammonium hydroxide or other organic amines are preferred neutralents. If the polymeric adhesion promoter is hydrophobic, any base can be used to neutralize the latex such as alkali hydroxides or amines. A greater choice of neutralents exists for the adhesive containing the hydrophobic polymeric adhesion promoter because the hydrophobic polymeric adhesion promoter is thought to contribute less water sensitivity to the adhesive than the hydrophilic polymeric adhesion promoter. Therefore, if a large concentration of the adhesive is water-sensitive components, such as hydrophilic polymeric adhesion promoters or alkyl hydroxides, the adhesive is thought to lose bond strength at higher humidity levels.

The peel adhesion for plastic film to plastic film is measured by a T-Peel test (ASTM D-1876-72) on an Instron. Plastic film to paperboard peel adhesion is measured by pulling the film from the paperboard on an Instron at a 180° peel.

Coagulation of the Adhesive During Processing of a Laminate

If the adhesive is used to prepare a laminate, and hard watery that is water containing greater than about 150 ppm of ions, is used to clean the laminating equipment, the adhesive may coagulate. The coagulated adhesive is difficult to remove from the laminating equipment. The coagulation caused by the ions can be prevented by adding a particular surfactant to the system at any time during the process, for example, during the emulsion polymerization of the latex or after the adhesive has been formulated. The surfactant is chosen to prevent the coagulation without adversely affecting the adhesive properties of the adhesive.

Typical examples of suitable surfactants are: DOWFAX® 8390, a mixture of hexadecyl(sulfophenoxy) benzenesulfonic acid, disodium salt and oxybis (hexadecylbenzenesulfonic acid), disodium salt, available from The Dow Chemical Company; Polywet® KX-4 a potassium salt of oligomers made from several functional monomers and containing a non-functional hydrocarbon end group, produced by Uniroyal Chemical; and Igepal® C0630, a nonylphenoxypoly (ethyleneoxy) ethanol available from GAF Corporation.

Typically the amount of surfactant effective to prevent coagulation will be from about 0.5 to about 5 weight parts based on the weight of latex solids. Preferably, the amount of surfactant effective to prevent coagulation will be from about 2 to about 4 weight parts based on the weight of latex solids.

Epoxy Emulsion

When the adhesive is to be exposed to more extreme humid conditions, such as when used for meat a cheese packaging, it may be desirable to add an epoxy resin to the adhesive formulation, the epoxy resin emulsion component is suitably any compound which possesses more than a 1,2-epoxy group. In general, the epoxy emulsion component is saturated or unsaturated aliphatic or cycloaliphatic, aromatic or heterocyclic and can be substituted or unsubstituted. The epoxy emulsions may be selected from the polyglycidyl ethers of bisphenol compounds, the polyglycidyl ethers of a novolac emulsion, and the polyglycidyl ethers of a polyglycol. Mixtures of two or more epoxy emulsions can also be used.

The preferred epoxy resin emulsions are the polyglycidyl ethers of bisphenol compounds. The polyglycidyl ethers of bisphenol A or bisphenol F have been found to be suitable. The epoxy emulsions may be formed as the reaction products of epichlorohydrin and bisphenol A or bisphenol F or derivatives thereof.

The Preparation of the Epoxy Emulsion

The epoxy emulsion is prepared by dispersing epoxy resin in water with a surfactant. The concentration of the epoxy resin in the emulsion is typically from about 90 to about 95 percent. The surfactants employable to disperse the epoxy resin are typically conventional nonionic or anionic surface active agents. Nonionic surfactants include the ethylene oxide derivatives of long chain alcohols and alkyl phenols such as octyl or nonylphenol containing from 10 to 60 moles of ethylene oxide per mole of the phenol. Suitable anionic surfactants include alkyl sulfates such as lauryl sulfates and alkyl sulfonates which include the esters of sulfonated dicarboxylic acids, succinic acid for example.

The epoxy emulsion is typically present in the adhesive formulation in an amount sufficient to improve adherence of the surface of a first substrate to the surface of the same or different substrate. Typically, a sufficient amount is an amount of from about 2 to about 25 weight percent based on the total weight of the latex. Preferably the epoxy resin emulsion is present in the adhesive formulation in an amount of from about 4 to about 15 weight percent based on the total weight of the latex. Most preferably, the epoxy is present in the adhesive formulation in an amount of from about 6 to about 10 weight percent based on the total weight of the latex.

Preparation of the Adhesive containing Epoxy Resin in the Adhesive

The polymeric adhesion promoter is added to the latex while stirring until the polymeric adhesion promoter concentration reaches a desired concentration which is typically about 6 percent based on latex solids. An epoxy emulsion is then added until the epoxy concentration reaches a desired concentration which is typically about 6 percent based on latex solids. The adhesive is then diluted to a desired concentration which is typically about 40 percent total solids.

The pot-life of the adhesive can be determined by measuring the viscosity of the adhesive formulation over time. The viscosity is measured using a Brookfield viscometer and the pot-life is considered exhausted if the adhesive gels or if the viscosity measurement is above about 250 centipoise.

The Preparation of the Laminate Containing Epoxy Resin in the Adhesive

The formulated adhesive is then applied to the film and the coated film is dried. The dried coated film is then laminated to another film.

The peel adhesion for plastic film to plastic film is measured by a T-Peel test (ASTM D-1876-72) on an Instron. The humidity test is performed by enclosing the laminates in a chamber at 23° C. and 100 percent relative humidity (RH). The peel adhesion is then measured after 200 hours of exposure.

Coagulation of the Adhesive containing Epoxy Resin in the Adhesive During Processing of a Laminate If the adhesive is used to prepare a laminate, and hard water, that is water containing greater than about 150 ppm of ions, is used to clean the laminating equipment, the adhesive may coagulate. The coagulated adhesive is difficult to remove from the laminating equipment. The coagulation caused by the ions can be prevented by adding a particular surfactant to the system at any time during the process of preparing the adhesive; for example the surfactant can be added during the emulsion polymerization of the latex or after the adhesive has been formulated. The surfactant is chosen to prevent the coagulation without adversely affecting the adhesive properties of the adhesive.

Typical examples of suitable surfactants are: DOWFAX® 8390, a mixture of hexadecyl(sulfophenoxy) benzenesulfonic acid, disodium salt and oxybis (hexadecylbenzenesulfonic acid), disodium salty available from The Dow Chemical Company; Polywet® KX-4 a potassium salt of oligomers made from several functional monomers and containing a non-functional hydrocarbon end group, produced by Uniroyal Chemical; and Igepal® C0630, a nonylphenoxypoly (ethyleneoxy) ethanol available from GAF Corporation.

Typically the amount of surfactant effective to prevent coagulation will be from about 0.5 to about 5 weight parts based on the weight of latex solids. Preferably, the amount of surfactant effective to prevent coagulation will be from about 2 to about 4 weight parts based on the weight of the latex solids.

The following examples are intended to illustrate the invention but not to limit the scope thereof. All parts and percentages are based on dry solids weight unless otherwise indicated.

FIRST SET OF EXAMPLES: ADHESIVES COMPRISING ADHESION PROMOTER AND LATEX

Example 1.1

Latex A with a composition of 48.3 parts styrene, 50.0 parts butadiene and 1.7 parts itaconic acid and Latex B with a composition of 48.0 parts styrene, 50.0 parts butadiene, 2.0 parts itaconic acid are formulated. Latex A has a higher degree of crosslinking than Latex B and is only about 10 percent soluble in tetrahydrofuran (THF) whereas Latex B is about 90 percent soluble in THF. To the above control formulations, 6 percent BOS (based on latex solids) of various types of polymeric adhesion promoters are post-added. All of the formulations are adjusted to 35 percent solids with a 50/50 mixture of isopropanol and water, and a suitable wetting agent. The adhesive formulations are applied to a corona treated polypropylene film (Mobil LCM 410 film) by drawing it down the film using #3 Meyer rod, which is equivalent to applying approximately 1.5 to 2.0 lbs/ream (3,000 sq. ft.).

This adhesive coated film is then dried in a forced air oven for approximately three minutes at 50° C., after which the film is laminated to the polypropylene side of a one side polyvinylidene chloride coated 70 gauge polypropylene film, (Mobil 70 PXS), using 25 psi pressure at 95° C. for 5 seconds. The laminates are cut into ½ inch strips and the peel adhesion is determined on an Instron using T-peel test (ASTM D-1876-72) at 12 inches/minute. The results listed in Table I indicate a significant increase in T-peel strength by the incorporation of the above-listed polymeric adhesion promoters in the adhesive formulations based on styrene/butadiene copolymer latexes.

Polyamidoamine Types Used in Table I

1. Branched polyamidoamine, based on methyl acrylate and ethylenediamine.
2. Crosslinked polyamidoamine, based on methyl acrylate and ethylenediamine.
3. Linear polyamidoamine, based on methyl acrylate and ethylenediamine.
4. Linear polyamidoamine, based on adipic acid and diethylenetriamine.
5. Polyamidoamine resin derived from fatty acids and polyamine.
6. Polyamide resin derived from dimer acids and polyamine.

TABLE I

EFFECT ON T-PEEL STRENGTH OF LAMINATES ON ADDING 6 PERCENT OF VARIOUS TYPES OF POLYAMIDOAMINE

| | T-Peel Strength (GM/IN) | |
| --- | --- | --- |
| Type of Polyamidoamine | Base Latex A from Example 1 | Base Latex B from Example 1 |
| None | 80 | 237 |
| 1 | 298 | 315 |

TABLE I-continued

EFFECT ON T-PEEL STRENGTH OF
LAMINATES ON ADDING 6 PERCENT OF
VARIOUS TYPES OF POLYAMIDOAMINE

| Type of Polyamidoamine | T-Peel Strength (GM/IN) | |
|---|---|---|
| | Base Latex A from Example 1 | Base Latex B from Example 1 |
| 2 | — | 303 |
| 3 | 236 | 402 |
| 4 | — | 417 |
| 5 | 97 | — |
| 6 | 106 | 260 |

Example 1.2

The latexes listed in the following Table II are formulated with 6 percent linear polyamidoamine based on adipic acid and diethylenetriamine, and a suitable wetting agent. In this example adhesives are drawn down on corona treated (Hercules B-523) polypropylene films and are laminated to Mobil's 70 PXS film as described in Example 1.1. The T-peel strengths of the laminates are determined as described in Example 1.1. The results are as follows in Table II.

TABLE II

| | T-Peel Strength (gm/in) | |
|---|---|---|
| Latex Type | Control 0% | 6% Linear Polyamidoamine |
| Styrene/-butadiene/n-butyl acrylate/itaconic acid 36/40/22/2 | 300 | 567 |
| Vinylidene chloride/butadiene/ itaconic acid 52/46/2 | 65 | 151 |
| Styrene/n-butyl acrylate/ itaconic acid 30/67/3 | 174 | 247 |
| Ethylacrylate/N-methylol acrylamide/acrylamide 96/2.5/1.5 | 79 | 221 |

Example 1.3

A latex with a composition of 58 parts styrene, 38 parts butadiene and 4 parts acrylic acid is formulated with a suitable wetting agent. Four percent BOS branched polyamidoamine is post-added to the formulation to yield the adhesive. The adhesive is applied to the corona treated side of a 57 gauge polyethylene/polypropylene copolymer film (Mobil 57 AHX) by drawing it down with a #6 Meyer rod. Printed paperboard is laid on the adhesive coated 57 AHX film and wet laminated before the adhesive is permitted to dry out.

The laminate is passed through the padder to apply pressure and placed in a forced air oven for 3 minutes at 60° C. One inch wide cuts are made through the film and part way through the board. The films are pulled on an Instron at 180° peel and a rate of 12 inches/minute at 72° F. The resulting peel force is 525 gm/inch, the resulting peel force of the laminate without polyamidoamine is 275 gm/inch.

Example 1.4

A latex with a composition of 46.0 parts styrene, 50.0 parts butadiene and 4.0 parts acrylic acid is prepared by conventional emulsion polymerization techniques. A 28 percent solution of ammonium hydroxide is added to bring the pH of the solution to a pH of about 10.0. Three comparative examples, 4A, 4B and 4C are prepared by adding either sodium hydroxide or ammonium hydroxide as specified in Table III, to the latex to bring the pH to about 10.0.

A 20 percent solution of a polyamidoamine, polyamidoamine A of Table III, based on condensation products of polyamines and dimer acids, having a viscosity of 4000 poise and an amine value of 240, is prepared by diluting the polyamidoamine using a mixture of 55/45 isopropanol/ water. The polyamidoamine is added to the latex while stirring until the polyamidoamine reaches 6 percent based on solids. All the formulations are adjusted to 35 percent solids with a 50/50 mixture of isopropanol and water and suitable wetting agents. The adhesive formulations of Table III are applied to a corona treated polypropylene film (Hercules B523 film) by drawing it down the film using #3 Meyer rods which is equivalent to applying approximately 1.5 to 2.0 lbs/ream (3,000 sq. ft.).

This adhesive coated film is then dried in a forced air oven for approximately three minutes at 65° C., after which the film is laminated to the polypropylene side of a one side polyvinylidene chloride coated 70 gauge polypropylene film, (Mobil 70 PXS), using 25 psi pressure at 95° C. for 5 seconds. The laminates are cut into ½ inch strips and the peel adhesion is determined on an Instron using T-peel test (ASTM D-t876-72) at 12 inches/minute after conditioning the strips at room temperature (22° C.) and 100 percent relative humidity. Comparative adhesive examples, 4A, 4B, and 4C are made to demonstrate the effect of humidity on laminates using an adhesive outside the scope of the invention. The comparative adhesives consist of latexes neutralized with sodium hydroxide or ammonium hydroxide and a polyamidoamine, polyamidoamine B of Table III, having a viscosity of 150 poise at 25° C. and an amine value of above 350 mg KOH/g. The polyamidoamine B solution is prepared similarly to polyamidoamine A.

The results listed in Table III indicate a significant increase in T-peel strength of the laminates exposed to humid conditions by the incorporation of the above-listed polyamidoamine adhesion promoter in the adhesive formulation based on a styrene/butadiene copolymer latex neutralized with base such as ammonium hydroxide. This is in comparison to those identical latexes neutralized with sodium hydroxide and those identical latexes formulated in an adhesive with a polyamidoamine outside the amine value range of the present invention.

TABLE III

| | Neutralization of Base Latex | | | | | |
|---|---|---|---|---|---|---|
| Ad-hes-ive | Base Type | Types/ Level of polyamido-amine | Amine Value | T-Peel Strength (gm/inch) | | |
| | | | | Dry | Humid | Percent Retention |
| 4A* | NaOH | B | 370–400 | 220 | 10 | 4 |
| 4B* | NH₄OH | B | 370–400 | 160 | 50 | 31 |
| 4C* | NaOH | A | 236–240 | 230 | 50 | 21 |
| 4 | NH₄OH | A | 236–240 | 200 | 190 | 95 |

*Comparative Examples, not examples of the invention.

Examples 1.5 and 1.6—Evaluation of peel strength of the adhesive plus surfactant in a laminate A latex with a composition of 47.5 parts styrene, 50.0 parts butadiene and 2.5 parts acrylic acid is prepared by conventional emulsion polymerization techniques. A 20 percent percent solution of potassium hydroxide is added to bring the pH of the solution to a pH of about 10.0. Two parts based on latex solids, of Dowfax®8390 for Example 1.5 and three parts based on latex solids, of Dowfax® 8390, for Example 1.6 is added to the latex and the mixture is thoroughly stirred.

A 15 percent solution of a polyamidoamine based on condensation products of polyamines and dimer acids, having a viscosity of 7–9 poises at 75° C. and an amine value of 330–360, is prepared by diluting the polyamidoamine in water. The polyamidoamine is added while stirring until the polyamidoamine reaches percent based on solids.

The adhesive is tested for hard water stability by the following method:

To 0.2 gm of the adhesive which is aged for about 48 hours, is added about 20 cc of water containing about 150 ppm of divalent ions such as calcium. The mixture is hand shaken for 100 shakes and is then examined for coagulation. A Comparative Example 1.5A is prepared which contains no Dowfax® 8390, only the adhesive and hard water. The data are shown in the following table. Example 1.7 is prepared similarly to Example 1.5 but Polywet® KX-4 is used as the surfactant. Example 1.8 is also prepared similarly to Example 1.5 but Igepal® C0630 is used as the surfactant. Alipal® CO-433 a sodium salt of sulfonated nonylphenoxypoly (ethyleneoxy) ethanol available from GAF Corporation is also tested as a coagulant inhibitor however, the surfactant failed to inhibit coagulation and is included as Comparative Example 1.5B in the Table IV.

TABLE IV

| EXAMPLE | Level of Surfactant Post-Added Based On Latex Solids | Stability of Adhesive Systems Toward Hard Water Test |
| --- | --- | --- |
| Example 1.5 | 2 | not coagulated |
| Example 1.7 | 2 | not coagulated |
| Example 1.8 | 2 | slightly coagulated |
| Comparative Example 1.5A | 0 | highly coagulated |
| Comparative Example 1.5B | 2 | highly coagulated |

The peel strength of a laminate prepared with an adhesive containing the surfactant is evaluated as follows. The formulations are adjusted to 30 percent solids with a 50/50 mixture of isopropanol and water and suitable wetting agents. The adhesive formulations are applied to a corona treated polypropylene film (Hercules B523 film) by drawing it down the film using #3 Meyer rod, which is equivalent to applying approximately 1.5 to 2.0 lbs/ream (3,000 sq. ft.).

This adhesive coated film is then dried in a forced air oven for approximately three minutes at 65° C., after which the film is laminated to the polypropylene side of a one side polyvinylidene chloride coated 70 gauge polypropylene film, (Mobil 70 PXS), using 25 psi pressure at 95° C. for 5 seconds. The laminates are cut into ½ inch strips and the peel adhesion is determined on an Instron using T-peel test (ASTM D-]876-72) at 12 inches/minute. The results recorded in Table V, indicate that the adhesive containing the surfactant at 2 or 3 parts does not lose significant peel strength in comparison to the laminate prepared with an adhesive containing no post-added surfactant.

TABLE V

| Surfactant Type Post-Added to Formulate Adhesive System | Level of Dowfax ® 8390 Post-Added Based On Latex Solids | Peel Strength (gm/in) |
| --- | --- | --- |
| Comparative Example 1.5A | 0 | 250 |
| Example 1.5 | 2 | 200 |
| Example 1.6 | 3 | 220 |

SECOND SET OF EXAMPLES ADHESIVES CONTAINING ADHESION PROMOTER, EPOXY RESIN AND LATEX

Polymeric latex Compositions:
  Latex 1: Styrene/Butadiene/Acrylic Acid (46/50/4)
  Latex 2: Styrene/Butadiene/Acrylic Acid (47.5/50/2.5)
  Latex 3: Sec-Butyl Acrylate/Acrylic Acid (97/3)
  Latex 4: Styrene/Butadiene/Acrylic Acid (58/38/4)
  Latex 5: Styrene/Butadiene/Itaconic Acid (33/65/2)

Polymeric adhesion promoters:
  A. Polyamidoamine, based on condensation products of polyamines and dimer acids having an amine value of 168–182 and a viscosity of 8–15 poises at 40° C.
  B. Polyamidoamine, based on condensation products of polyamine and dimer acids, having an amine value of 330–360 and a viscosity of 8–12 poises at 40° C.
  C. Polyamidoamine, based on condensation products of polyamines and dimer acids, having an amine value of 330–360 and a viscosity of 7–9 poises at 75° C.
  D. Polyethyleneimine, of 1200 molecular weight.

·Epoxy Emulsions:
  A. Epoxy emulsion based on a 50/50 blend of epoxy resin of polyglycidylethers of bisphenol A and F ((XQ82312.00) available from The Dow Chemical Company).
  B. Epoxy emulsion based on polyglycidyl ethers of bisphenol compound having an equivalent weight per epoxide of 206 and a viscosity of 2.5–4 poises at 25° C. (492X6213 available from Daubert Chemical Co.).
  C. Epoxy emulsion based on modified polyglycidyl ether of bisphenol A with an average functionality of 3, having a weight per epoxide of 215, and Brookfield Viscosity of 10–15 poises at 25° C., ((RDX80204) available from Interez, Inc.).
  D. Epoxy emulsion based on modified polyglycidyl ether of Bisphenol A with an average functionality of 3, having a weight per epoxide of 205, and Brookfield Viscosity of 10 poises at 25° C., ((W55-5003) available from Interez, Inc.).

Example 2.1
  Latex 1—Styrene/Butadiene/Acrylic Acid (46/50/4)

All measurements are in dry solids parts per one hundred parts total monomers. Into a one-gallon, jacketed reactor equipped with lab pumps to deliver monomer and aqueous feeds are added 52.05 parts of deionized water, 0.01 parts of a one-percent active aqueous pentasodium diethylene triamine pentacetate solution, and a sufficient amount of seed to yield a latex polymer having an average particle size of approximately 1050 Å. The reactor is purged with nitrogen and heated to 90° C. Then, over a four hour period is added a monomer stream containing 26.00 parts of styrene, 2.00 parts of tertiary dodecyl mercaptan, 3.00 parts of carbon tetrachloride and 50.00 parts of butadiene.

Beginning simultaneously with the start of the monomer stream is added a second monomer stream, also over a four hour period, 20.00 parts of styrene and 4.00 parts of acrylic acid.

Beginning simultaneously with the start of each of the above monomer streams is added continuously over a four hour period, 14.70 parts of deionized water, 0.50 parts of a 45 percent active aqueous solution of sodium salt of dodecylated phenyl ether, 0.14 parts of a 10 percent aqueous sodium hydroxide, and 0.70 parts of sodium persulfate.

Following the addition of the monomer streams and aqueous streams, the reaction mixture is maintained at 90° C. for one additional hour and then cooled. The latex is steam distilled to remove unreacted monomers and neutralized with ammonium hydroxide to a pH of 10.

A 20 percent solution of the polymeric adhesion promoter 1 is prepared by diluting the polyamidoamine using a mixture of 55/45 isopropanol/water. The polyamidomine is added to the latex while stirring until the polyamidoamine reaches 6 percent based on solids. Epoxy emulsion A is then added until the epoxy concentration reaches 10 percent based on solids. The adhesive is then diluted to 40 percent total solids using deionized water.

The formulated adhesive is then applied to the corona treated side of a coextruded polyethylene-vinyl acetate/gurlyn film using a #6 Meyer rod. The coated film is then dried in a forced air oven at 65° C., for 3 minutes. The dried coated film is then laminated to the PVDC (polyvinylidene chloride) coated side of a PVDC coated OPET (oriented polyethylene terephthalate), at 95° C. at 30 PSI for 5 seconds. The dry strength of the laminate is determined using a T-peel test on an Instron instrument (ASTM D1876-2). The ends of the two laminate films (½" width) are secured in the laws of the instron and pulled apart at a peel rate of 12 inches/minute.

The humidity test is performed by enclosing the laminates in a chamber at 100 percent RH, and 23° C. The peel adhesion is then measured after 200 hours of exposure.

The results of the peel test and humidity test are reported in Table I below. All of the latexes of the adhesives in Table I are made similarly as described above. Adhesive number 1 is an example of the invention, an adhesive containing a latex, a polymeric adhesion promoter and an epoxy emulsion. The comparative adhesives are not examples of the invention but are included to demonstrate the properties of example adhesives. Comparative adhesive 1A is a comparative example to demonstrate the adhesive strength of a latex based adhesive which does not contain either a polymeric adhesion promoter or an epoxy emulsion. Comparative adhesive 1B is also a comparative example to demonstrate an adhesive containing a latex and a polymeric adhesion promoter, but no epoxy. Similarly, comparative adhesive 1C is also a comparative example to demonstrate an adhesive containing a latex and epoxy, but no polymeric adhesion promoter.

TABLE I

| Adhesive | Percent Adhesion Promoter A | Percent Epoxy A | T-Peel Force 2 Weeks (gm/in) Dry | T-Peel Force 2 Weeks (gm/in) Wet | Percent Retention of dry strength to wet strength |
|---|---|---|---|---|---|
| Example 2.1 | 6 | 10 | 368 | 336 | 91 |
| Comparative Example 2.1A | 0 | 0 | 430 | 32 | 7 |
| Comparative Example 2.1B | 6 | 0 | 508 | 241 | 59 |
| Comparative Example 2.1C | 0 | 10 | 272 | 204 | 75 |

The data shown in Table I demonstrate the humidity exposure peel strength and dry peel strength of the adhesive containing both an epoxy and polymeric adhesion promoter with the latex, which is higher than those adhesives without both an epoxy and polymeric adhesion promoter present.

Example 2.2

The results of a similar peel test and humidity test based on Latex 2 are reported in Table II below. The adhesive based on Latex 2 of Table II is made similarly as described above in Example 2.1, however, the latex is neutralized with potassium hydroxide to a pH of 9.75. The adhesives and the laminates of Example 2.2 are also made similarly to Example 2.1. Example 2.2 —adhesive 2 of Table II is an example of the invention, an adhesive containing a latex, a polymeric adhesion promoter and an epoxy resin emulsion. Latex 2 is prepared similarly to Example 2.1 with 47.5 parts styrene, 50 parts butadiene, and 2.5 parts acrylic acid with 2.3 parts tertiary dodecyl mercaptan. The epoxy of adhesive 2 is epoxy B. The polymeric adhesion promoter is polymeric adhesion promoter B. Comparative adhesive 2.2A, based on Latex 2, is a comparative example to demonstrate the adhesive strength of a latex based adhesive which does not contain either a polymeric adhesion promoter or an epoxy emulsion. Comparative adhesive 2.2B based on Latex 2, is also a comparative example to demonstrate an adhesive containing a latex and a polymeric adhesion promoter, but no epoxy. Similarly, comparative adhesive 2.2C based on Latex 2, is also a comparative example to demonstrate an adhesive containing a latex and epoxy, but no polymeric adhesion promoter.

TABLE II

| Example | Percent Adhesion Promoter B | Percent Epoxy B | Green Strength (gm/in) | Dry Strength (gm/in) | Wet Strength (gm/in) | Percent Retention |
|---|---|---|---|---|---|---|
| 2.2 | 6 | 6 | 495 | 500 | 515 | 103 |
| Comparative Example 2.2A | 0 | 0 | 477 | 410 | 0 | 0 |
| Comparative Example 2.2B | 6 | 0 | 516 | 428 | 19 | 4 |
| Comparative Example 2.2C | 0 | 6 | 538 | 479 | 0 | 0 |

The data from Table II illustrate the increase in wet strength and increase in percent retention of an adhesive prepared with both an epoxy and a polymeric adhesion promoter added to a latex.

Examples 2.3 and 2.4

Example 2.3 is an adhesive prepared with Latex 3 which is a latex having 97 parts sec-butyl acrylate and 3 parts acrylic acid neutralized to a pH of 9.75 with potassium hydroxide. The epoxy of the adhesive using Latex 3 is epoxy B, at 6 percent solids and the polymeric adhesion promoter of the adhesive using Latex 3 is 6 percent solids of polymeric adhesion promoter B.

Example 2.4 is an adhesive prepared with Latex 4 which is a latex having 58 parts styrene, 38 parts butadiene and 4 parts acrylic acid. The latex is neutralized to a pH of 9.75 with potassium hydroxide. The epoxy of the adhesive using Latex 4 is 6 percent solids of epoxy B and the polymeric adhesion promoter of the adhesive using Latex 5 is 6 percent solids of polymeric adhesion promoter B.

The data in Table 111 illustrate the strengths of laminates prepared from adhesives using a different latex with the same neutralent, polymeric adhesion promoter and epoxy. The percent wet and dry strengths and percent retention remain at acceptable levels. The laminates of Table Ill are prepared similarly to those in Example 2.1.

TABLE III

| Example Adhesive | Green Strength (gm/in) | Dry Strength (gm/in) | Wet Strength (gm/in) | Percent Retention |
|---|---|---|---|---|
| 1 | — | 368 | 336 | 91 |
| 2 | 495 | 500 | 575 | 103 |
| 3 | 428 | 544 | 461 | 85 |
| 4 | 358 | 460 | 287 | 62 |

Examples 2.5 and 2.6

The data in Table IV exemplify the effects of changing polymeric adhesion promoter and epoxy emulsion on the wet and dry strength and percent retention of the adhesives, all of which remain at high levels. The laminates of Table IV are prepared similarly to those in Example 2.1.

Example 2.5 is an adhesive prepared with 90 percent Latex 4 and 10 percent of Latex 5 which is 33 parts styrene, 65 parts butadiene and 2 parts Itaconic acid. The epoxy of the adhesive of Example 2.5 is 6 percent solids of epoxy D, and the polymeric adhesion promoter of the adhesive of Example 2.5 is 4 percent solids of polymeric adhesion promoter D.

Example 2.6 is an adhesive prepared with Latex 2. The epoxy of the adhesive of Example 2.8 is epoxy C, at 6 percent solids and the polymeric adhesion promoter of the adhesive of Example 2.6 is 6 percent solids of polymeric adhesion promoter C.

TABLE IV

| Example | Epoxy | Adhesion Promoter | Dry Strength (gm/in) | Wet Strength (gm/in) | Percent Retention |
|---|---|---|---|---|---|
| 2.1 | A | A | 368 | 336 | 91 |
| 2.2 | B | B | 500 | 515 | 103 |
| 2.5 | D | D | 418 | 454 | 109 |
| 2.6 | C | C | 599 | 336 | 73 |

The data in Table V illustrate the effect of changing the latex neutralent on the strength of the adhesive. The adhesive of Comparative Example 2.5 is prepared similarly to the adhesive of Example 2.5 except the neutralent for Latex 4 is sodium hydroxide and not ammonium hydroxide. Example 2.7 is prepared similarly to Adhesive 2 except the latex of the adhesive is neutralized with sodium hydroxide.

The Table shows a more hydrophilic polymeric adhesion promoter like polyethyleneimine requires a less hydrophilic neutralent like ammonium hydroxide to impart a high percent retention to the adhesive. If the polymeric adhesion promoter is less hydrophilic such as polyamidoamine polymeric adhesion promoter By (of Example 2.2 and 2.7), a neutralent such as sodium hydroxide or potassium hydroxide can be used without sacrificing the high percent retention of peel strength.

Comparative Example 2.5 illustrates a decrease in wet strength and therefore, percent retention because Latex 4 is neutralized with sodium hydroxide and the polymeric adhesion promoter is the more hydrophilic polyethyleneimine. Both the sodium hydroxide and the polyethyleneimine are highly water sensitive which increases the water sensitivity of the adhesive, thereby reducing the wet strength of the laminate bond.

TABLE V

| Example | Dry Strength (gm/in) | Wet Strength (gm/in) | Percent Retention |
|---|---|---|---|
| 2.2 | 500 | 515 | 103 |
| 2.5 | 418 | 454 | 109 |
| Comparative Example 2.5 | 1500 | 0 | 0 |
| 2.7 | 522 | 512 | 98 |

Pot-life of the Adhesives of Examples 2.2–2.4

The viscosity measurement, with time, of the adhesive formulation can be used to determine the pot-life of the adhesive. The viscosity is measured by using a Brookfield viscometer set with a #3 spindle at 100 rpm.

The following Table VI demonstrates viscosity data for various types of adhesives of Examples 2.2, 2.3 and 2.4. The latexes and adhesives are prepared similarly to those prepared in Example 2.1.

Adcote® TT660 is not an example of the invention but is an acrylic based latex adhesive available from Morton Thiokol.

The viscosity of each adhesive shown in Table VI, indicates that the latex adhesive containing both the polymeric adhesion promoter and the epoxy has a greater pot-life than the Adcote® TT660 adhesive.

TABLE VI

| | Viscosity (cps) | | | |
|---|---|---|---|---|
| Example | 6 Hrs. | 22 Hrs. | 48 Hrs. | 960 Hrs. |
| 2.2 | 32 | 32 | 30 | 40 |
| 2.3 | 30 | 30 | 30 | |
| 2.4 | 65 | 50 | 36 | |
| Adcote TT660* | 57 | 264 | gel | gel |

*Not an example of the invention.

The viscosity data in the above Table VI illustrate those adhesives prepared with both a polymeric adhesion promoter and epoxy did not gel as did the commercially available latex adhesive. The data indicate a greater pot-life for those adhesives prepared with the present invention, thus allowing for a greater length of time to use the adhesive for laminating.

Example 2.7 —The addition of surfactant to the adhesive to prevent coagulation of the latex in water containing ions Latex 2 is prepared similarly to the latex of Example 2.1, however, the latex is neutralized with potassium hydroxide to a pH of about 10. 2 Parts based on latex solids, of Dowfax® 8390 is added to the latex and the mixture is stirred. A 15 percent aqueous dispersion of adhesion promoter C is prepared and is added to the latex and surfactant until the adhesion promoter reaches 6.0 percent based on solids. Epoxy B is then added until the epoxy concentration reaches 6 percent based on solids.

The adhesive is tested for hard water stability by the following method:

To 0.2 gm of the adhesive plus surfactant which is aged for about 48 hours, is added about 20 cc of water containing about 150 ppm of divalent ions such as calcium. The mixture is hand shaken for 100 shakes and is then examined for coagulation. A comparative example is prepared which contains no Dowfax® 8390. The data which demonstrate the coagulation inhibition by using the surfactant, are shown in the following table.

TABLE VII

| Example | Level of Dowfax ® 8390 Post-Added Based on Latex Solids | Stability of Adhesive System Toward Hard Water Test |
|---|---|---|
| Comparative Example 2.7 (no surfactant) | 0 | highly coagulated |
| 2.7 | 2 | not coagulated |

Evaluation of Peel Strength of the Adhesive Plus Surfactant in a Laminate

The adhesive plus surfactant is then used to prepare a laminate by adjusting the the adhesive to 30 percent solids with a 50/50 mixture of isopropanol and water. The adhesive is applied to the PVDC (polyvinylidene chloride) coated side of a PVDC coated OPET (oriented polyethylene terephthalate) by drawing it down the film using a #3 Meyer rod. The coated film is then dried in a forced air oven for approximately three minutes at 65° C. The film is then laminated to the corona treated side of a coextruded polyethylene-vinyl acetate/Surlyn film at 95° C. at 30 psi for 5 seconds. The laminates are cut into ½ inch strips and the peel adhesion is determined similarly to the peel adhesion of Example 2.1. The humidity test is also performed similarly as in Example 2.1. A comparative laminate is prepared wherein the adhesive is similar to the adhesive of Example 2.7 however, no Dowfax® 8390 is added.

The results are indicated in the following Table. The peel strength is determined as in Example 2.1. The data indicate that the peel strength, both wet and dry, is maintained in the presence of the post-added surfactant compared with the comparative example.

TABLE VIII

| Example | Level of Dowfax ® 8390 Post-Added Based on Latex Solids | Peel Strength (gms/in) Dry | Peel Strength (gms/in) Wet |
|---|---|---|---|
| Comparative Example 2.7 (no surfactant) | 0 | 440 | 340 |
| 2.7 | 2 | 400 | 390 |

What is claimed is:

1. An adhesive formulation for substrates which provides a bond between a substrate and a same or different substrate which consists essentially of: (i) a polymeric carboxylated styrene/butadiene latex; (ii) at least one polymeric adhesion promoter present in an amount sufficient to promote adherence of the surface of a first substrate to the surface of the same or different substrate, and (iii) an epoxy emulsion in an amount sufficient to improve adherence of the surface of the first substrate to the surface of the same or different substrate under humid conditions; whereby the adhesive formulation comprising (i), (ii) and (iii) provides an increase in percent retention between dry strength and wet strength of the bond over an adhesive formulation which does not comprise (i), (ii) and (iii).

2. The adhesive of claim 1 wherein the polymeric adhesion promoter is present in an amount of at least about 1 weight percent and no more than about 15 weight percent based upon the weight of the total polymeric latex adhesive.

3. The adhesive of claim 1 wherein the epoxy resin emulsion is present in an amount of from about 2 to about 25 weight percent based on the total weight of the polymeric latex.

4. The adhesive of claim 1 wherein the epoxy resin emulsion is present in an amount of from about 4 to about 15 weight percent based on the total weight of the polymeric latex.

5. An adhesive formulation for substrates which provides a bond between a substrate and a same or different substrate which consists essentially of: (i) a polymeric carboxylated styrene/butadiene latex; (ii) at least one polymeric adhesion promoter present in an amount sufficient to promote adherence of the surface of a first substrate to the surface of the same or different substrate and (iii) an epoxy emulsion in an amount sufficient to improve adherence of the surface of the first substrate to the surface of the same or different substrate under humid conditions, whereby the adhesive formulation comprising (i), (ii) and (iii) provides an increase in percent retention between dry strength and wet strength of the bond over an adhesive formulation which does not comprise (i), (ii) and (iii) and a surfactant whereby coagulation of the adhesive in water containing ions is inhibited.

6. The adhesive of claim 5 wherein the surfactant is present in an amount of from about 0.5 to about 5.0 weight percent of latex solids.

7. The adhesive of claim 6 wherein the surfactant is selected from the group consisting of a mixture of hexadecyl(sulfophenoxy) benzenesulfonic acid, disodium salt and oxybis (hexadecylbenzenesulfonic acid), disodium salt, a potassium salt of oligomers made from several functional monomers and containing a nonfunctional hydrocarbon end group; and a nonylphenoxypoly (ethyleneoxy) ethanol.

8. The adhesive of claim 1 wherein the polymeric adhesion promoter is selected from the group consisting of: polyamidoamine; polyamines; polydiallylamine; polyurea; polyurethane; hydrolyzed polyoxazoline; polymers from condensation reactions of epichlorohydrin and polyamines; copolymers of acrylamide; or poly(N-vinylpyrrolidone).

9. The adhesive of claim 1 wherein the polymeric adhesion promoter is selected from the group consisting of: polyamidoamine or polyamines.

10. The adhesive of claim 1 wherein the epoxy resin is selected from the group consisting of the polyglycidyl ethers of bisphenol compounds; the polyglycidyl ethers of a novolac emulsion; and the polyglycidyl ethers of a polyglycol.

* * * * *